United States Patent
Kamemura

(10) Patent No.: US 9,755,367 B2
(45) Date of Patent: Sep. 5, 2017

(54) CHARGING INLET

(71) Applicant: Sumitomo Wiring Systems, Ltd., Yokkaichi, Mie (JP)

(72) Inventor: Masato Kamemura, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 15/320,913

(22) PCT Filed: Jul. 15, 2015

(86) PCT No.: PCT/JP2015/070251
§ 371 (c)(1),
(2) Date: Dec. 21, 2016

(87) PCT Pub. No.: WO2016/010069
PCT Pub. Date: Jan. 21, 2016

(65) Prior Publication Data
US 2017/0149176 A1    May 25, 2017

(30) Foreign Application Priority Data
Jul. 17, 2014    (JP) ................. 2014-146531

(51) Int. Cl.
*H01R 13/641* (2006.01)
*B60L 11/18* (2006.01)
(Continued)

(52) U.S. Cl.
CPC ........ *H01R 13/641* (2013.01); *B60L 11/1818* (2013.01); *H01R 13/7175* (2013.01);
(Continued)

(58) Field of Classification Search
CPC .... H01R 13/641; H01R 13/74; H01R 13/746; H01R 13/748; H01R 13/7175; H01R 2201/26; B60L 11/1818; Y10S 439/918
(Continued)

(56) References Cited

U.S. PATENT DOCUMENTS 5,947,766 A * 9/1999 Tsuji ................. H01R 13/748
439/559
8,167,641 B2 * 5/2012 Thackston ........... H01R 13/748
439/382
(Continued)

FOREIGN PATENT DOCUMENTS

JP    2012-181984    9/2012
JP    2012-221613    11/2012
(Continued)

OTHER PUBLICATIONS

International Search Report of Oct. 6, 2015.

*Primary Examiner* — Tulsidas C Patel
*Assistant Examiner* — Travis Chambers
(74) *Attorney, Agent, or Firm* — Gerald E. Hespos; Michael J. Porco; Matthew T. Hespos

(57) ABSTRACT

A charging inlet (10) has an inlet body (20) including a first mounting plate (22) mounted on a body (B) of a vehicle. The first mounting plate (22) has fixed short collars (24), an indicator plate (30) including a second mounting plate (32) arranged between the body (B) and the first mounting plate (22) and having through holes (33) and fixing nuts (34) having the fixed portions (24) fixed thereto. The indicator plate (30) is mounted on the inlet body (20) by fixing the fixed portions (24) to the fixing portions (34). Long collars (23) project from the first mounting plate (22) toward the body (B) and penetrate the through holes (33) of the second mounting plate (32). Bolts (40) inserted into the tubular parts
(Continued)

(23) fix the inlet body (20) to the body (B) with ends (23A) of the tubular parts (23) held in contact with the body (B).

9 Claims, 7 Drawing Sheets

(51) Int. Cl.
    *H01R 13/74*     (2006.01)
    *H01R 13/717*     (2006.01)

(52) U.S. Cl.
    CPC ........... *H01R 13/74* (2013.01); *H01R 13/748* (2013.01); *H01R 2201/26* (2013.01)

(58) Field of Classification Search
    USPC .......... 439/490, 564, 578, 918, 97, 551, 801
    See application file for complete search history.

(56) References Cited

U.S. PATENT DOCUMENTS

| | | | |
|---|---|---|---|
| 9,505,313 B2* | 11/2016 | Shimizu | ............. H01R 13/4367 |
| 2012/0258635 A1 | 10/2012 | Osawa | |
| 2013/0249486 A1 | 9/2013 | Eberle | |
| 2014/0315426 A1 | 10/2014 | Osawa | |

FOREIGN PATENT DOCUMENTS

| | | |
|---|---|---|
| JP | 2013-197095 | 9/2013 |
| WO | 2013/061698 | 5/2013 |

* cited by examiner

CHARGING INLET

BACKGROUND

1. Field of the Invention

A technology disclosed by this specification relates to a charging inlet.

2. Description of the Related Art

Japanese Unexamined Patent Publication No. 2012-181984 discloses a charging connector for charging a battery by connecting a power feeding connector to a power receiving connector. In this charging connector, the power receiving connector and an illumination unit are disposed side by side and each of them is bolted to a body.

Since the power receiving connector and the illumination unit are provided separately in the above charging connector, an installation space on the body side is large. Further, since the power receiving connector and the illumination unit need to be bolted separately to the body, the number of fastening operations to the body increases and the number of fastening parts also increases. Accordingly, if the illumination unit is mounted on the power receiving connector in advance instead of being mounted on the body, the installation space on the body side becomes smaller and the number of the fastening operations to the body is reduced.

However, a fastening portion to the body needs to be configured by a circular tubular metal part (commonly called a metal collar or the like). In the case of mounting the illumination unit on the power receiving connector in advance, as described above, it is considered to set metal parts for both the illumination unit and the power receiving connector and fasten the metal parts to the body by one bolt inserted through these parts. However, in this configuration, two metal parts are necessary for one bolt. Therefore the number of parts increases.

SUMMARY

A charging inlet disclosed by this specification is provided with an inlet body including a first mounting plate to be mounted on a body of a vehicle. The first mounting plate has a fixed portion. An indicator plate including a second mounting plate is arranged between the body and the first mounting plate and has a through hole and a fixing portion with the fixed portion fixed thereto. The indicator plate is mounted on the inlet body by fixing the fixed portion to the fixing portion. A tubular part made of metal projects from the first mounting plate toward the body and penetrates through the through hole of the second mounting plate. A fixing part made of metal includes a shaft to be inserted into the tubular part and is configured to fix the inlet body to the body with an end part of the tubular part held in contact with the body.

According to this configuration, the tubular part (e.g. a part commonly called a collar or the like) made of metal and to be brought into contact with the body has to be provided only on the first mounting plate and it is sufficient to provide the second mounting plate with the through hole. Thus, an increase in the number of tubular parts can be prevented. Further, if the tubular part is inserted through the through hole, the fixed portion easily is positioned with respect to the fixing portion and the indicator plate easily is mounted on the inlet body by fixing the fixed portion to the fixing portion.

The charging inlet disclosed by this specification may also be configured as follows.

The inlet body may include a connector fitting portion and the indicator plate may include an indicator portion arranged around the connector fitting portion. According to this configuration, the charging inlet integrated with the indicator portion is configured by arranging the indicator portion around the connector fitting portion. Thus, the indicator portion need not be mounted on the body separately from the charging inlet and an insulation space on the body side becomes smaller.

The fixing part may be composed of a bolt having the shaft and a nut with which the bolt is threadedly engageable. According to this configuration, the inlet body can be fixed to the body by threadedly engaging the bolt with the nut.

The bolt may be fixed to the body. According to this configuration, it is not necessary to hold the bolt by hand and it is sufficient to pass the bolt fixed to the body through the tubular part and threadedly engage the nut with the bolt. Thus, the inlet body is fixed easily.

A plurality of the tubular parts may be provided on a peripheral edge part of the first mounting plate, and a plurality of the through holes may be provided on a peripheral edge part of the second mounting plate. According to this configuration, the fixed portion can be positioned accurately with respect to the fixing portion since the plurality of tubular parts can be passed through the plurality of through holes.

According to the charging inlet disclosed by this specification, it is possible to prevent an increase in the number of tubular parts.

DETAILED DESCRIPTION

Figure 1:
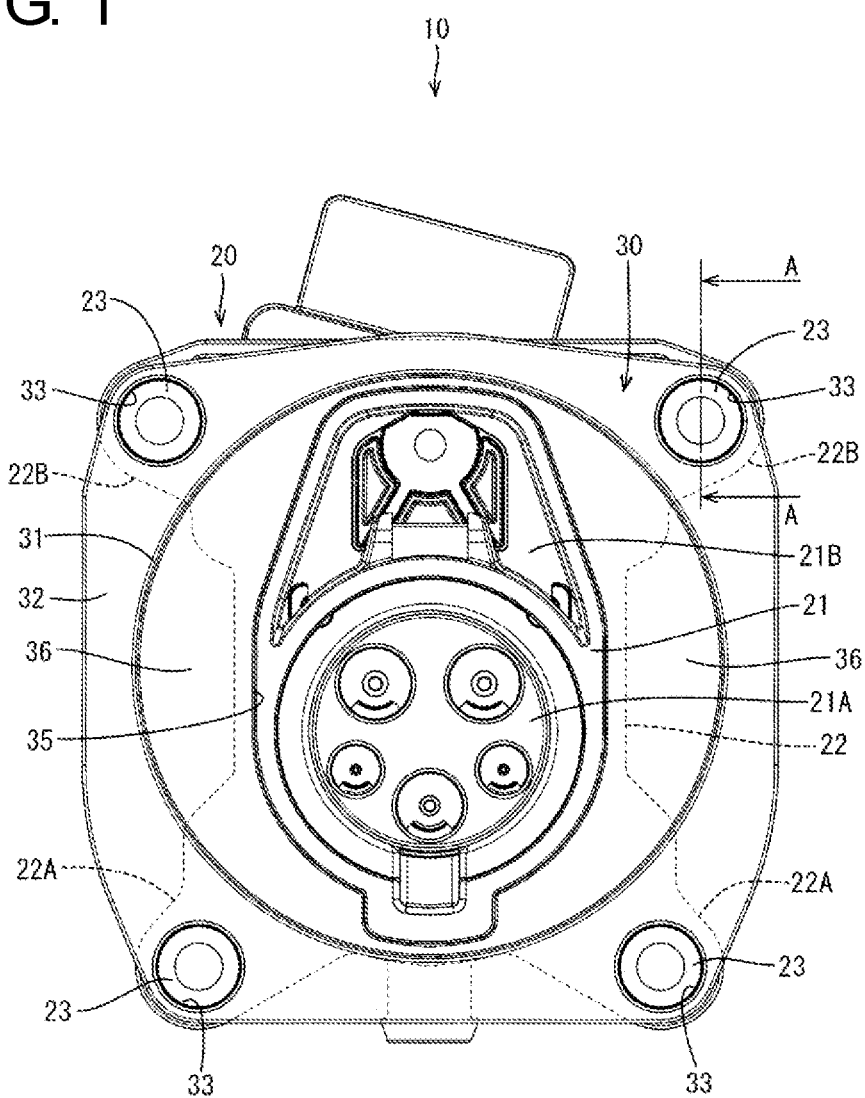
FIG. 1 is a front view of a charging inlet.

An embodiment is described with reference to FIGS. 1 to 7. A charging inlet 10 in this embodiment includes an inlet body 20 shown in FIG. 6 and an indicator plate 30 shown in FIG. 4. The inlet body 20 includes a connector fitting portion 21 into which a charging gun provided on an unillustrated power feeding side is fittable. This charging inlet 10 is fixed to a body B of a vehicle. Note that, in the following description, a side of the connector fitting portion 21 to be fit to the charging gun is referred to as a front side.

The connector fitting portion 21 includes a terminal connecting portion 21A to be connected to a terminal portion of the charging gun and a lock connecting portion 21B to be connected to a lock portion of the charging gun. The terminal connecting portion 21A includes a circular tubular peripheral wall and the U-shaped lock connecting portion 21B is provided to project up from the upper surface of this peripheral wall. Further, the inlet body 20 includes a first mounting plate 22 protruding toward an outer peripheral side of the connector fitting portion 21. This first mounting plate 22 radially projects with the connector fitting portion 21 as a center and is composed of left and right flanges 22A protruding obliquely down from the terminal connecting portion 21A and left and right flanges 22B protruding to the left and right from the lock connecting portion 21B.

A long collar 23 made of metal is fixed to a tip part of each flange 22A, 22B. On the other hand, a short collar 24 likewise made of metal is fixed to a base end part of each flange 22A, 22B. Each of the long collars 23 and the short collars 24 penetrates through the first mounting plate 22 in a plate thickness direction, and a dimension thereof in a front-back direction is longer than a plate thickness of the first mounting plate 22. Note that the long collars 23 and the short collars 24 are formed integrally to the first mounting plate 22 by insert molding.

Figure 4:
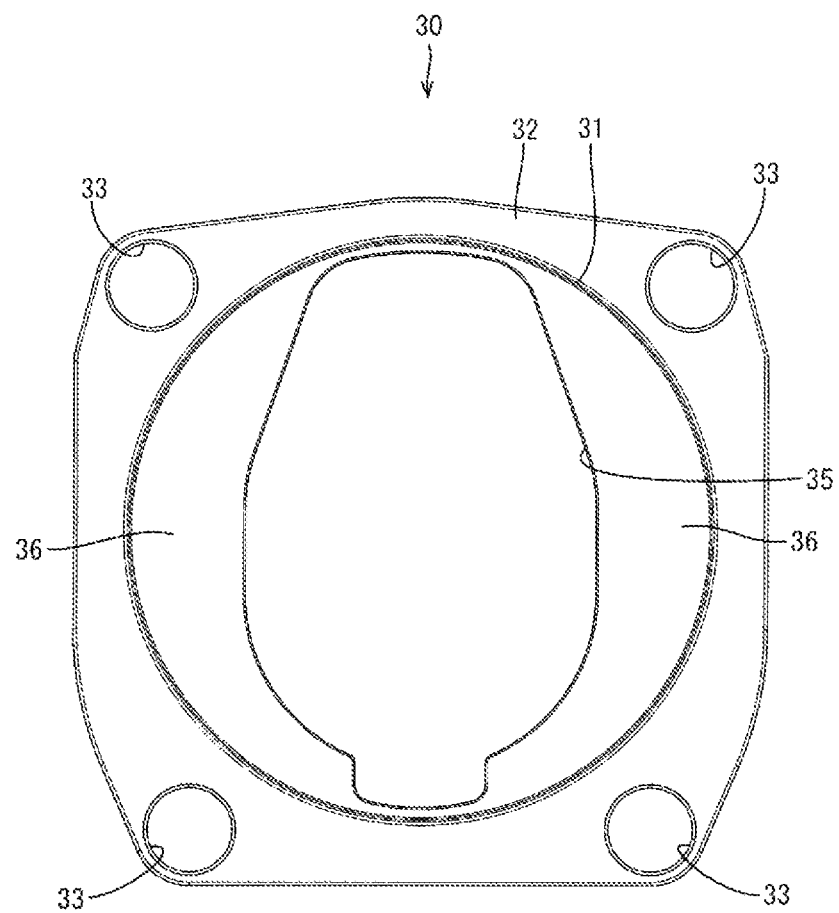
FIG. 4 is a front view of an indicator plate.
Figure 5:
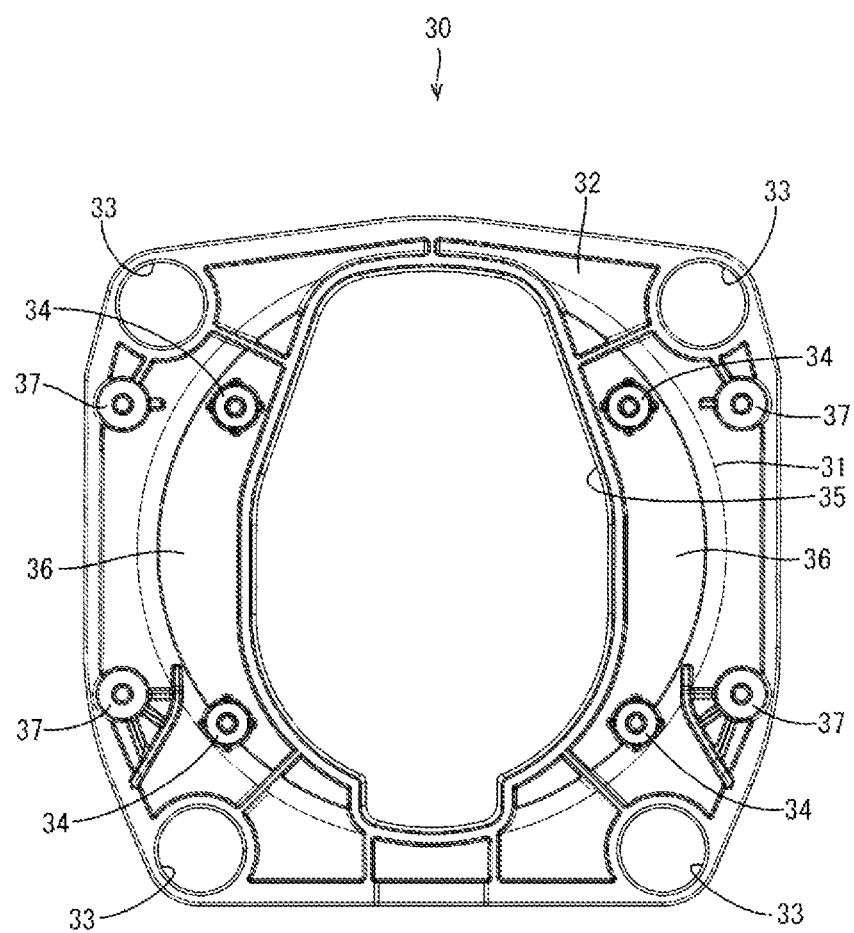
FIG. 5 is a rear view of the indicator plate.
Figure 6:
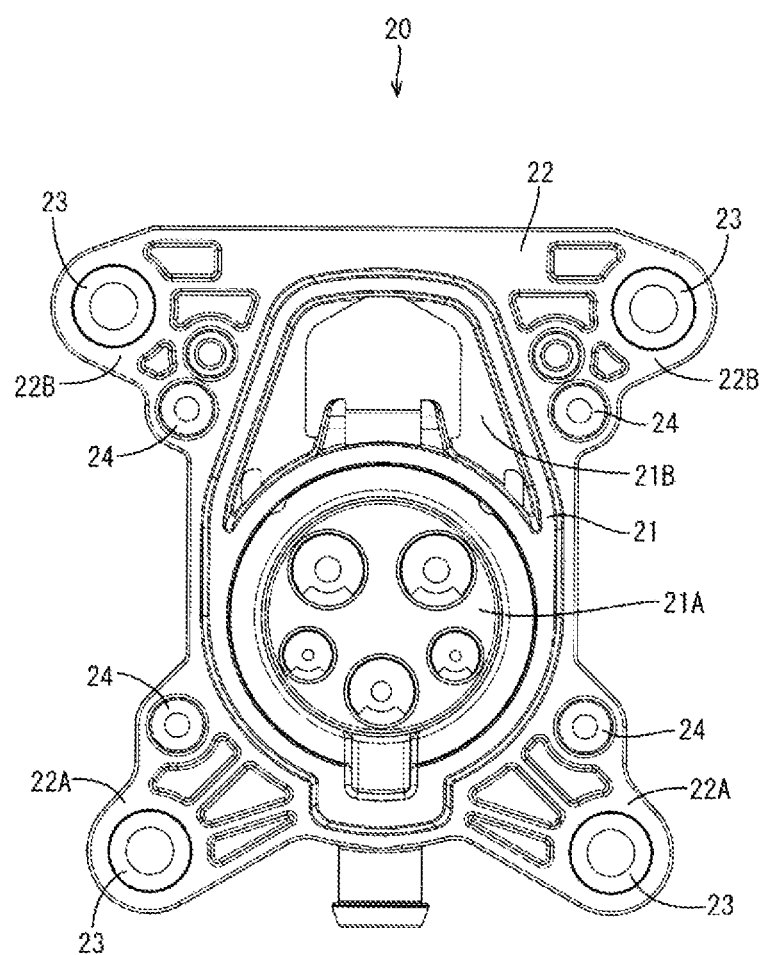
FIG. 6 is a front view of an inlet body.
Figure 7:
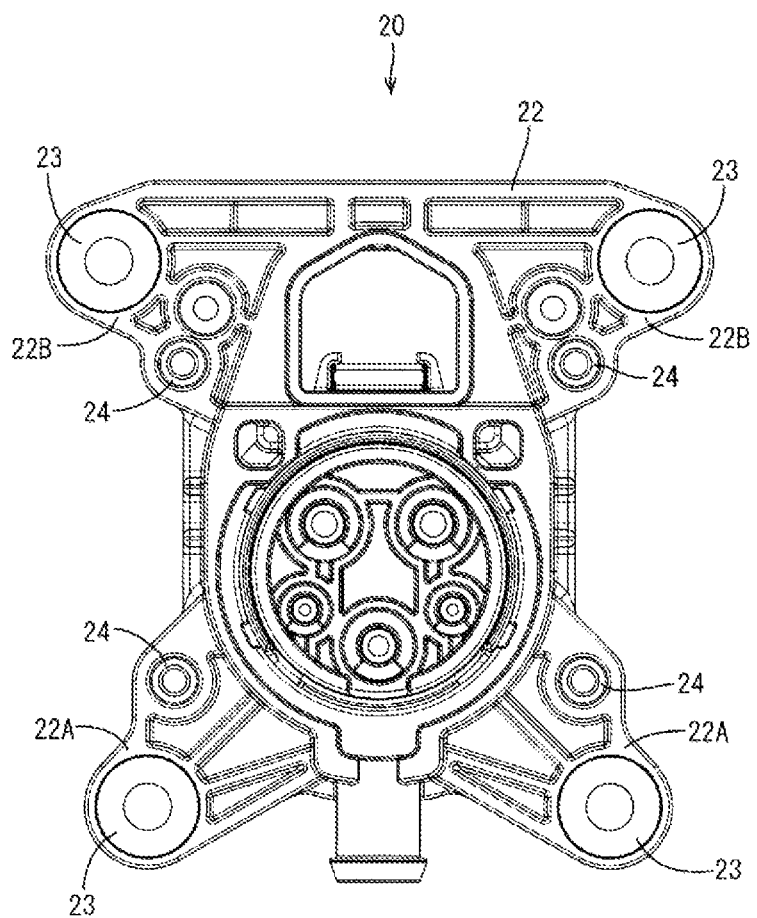
FIG. 7 is a rear view of the inlet body.

As shown in FIG. 4, the indicator plate 30 includes an indicator portion 31 having an accommodation hole 35 into which the connector fitting portion 21 is to be accommodated, and a second mounting plate 32 protruding toward an outer peripheral side of this indicator portion 31. The indicator portion 31 is substantially circular and is provided with a charging indicator 36 for indicating a state of charge or the like between the hole edge of the accommodation hole 35 and the outer peripheral edge of the indicator portion 31. As shown in FIG. 5, screw fastening portions 37 for fixing an unillustrated LED unit with screws are provided on a rear surface side of the second mounting plate 32. The charging indicator 36 is lighted by irradiating light forward from this LED unit. When the connector fitting portion 21 is accommodated into the accommodation hole 35, the indicator portion 31 is arranged around the connector fitting portion 21, as shown in FIG. 1.

Further, fixing nuts 34 are fixed on a rear surface of the indicator portion 31 by fixing means, such as press-fitting. These fixing nuts 34 are arranged at positions closer to the accommodation hole 35 than the respective screw fastening portions 37 in a lateral direction.

Figure 2:
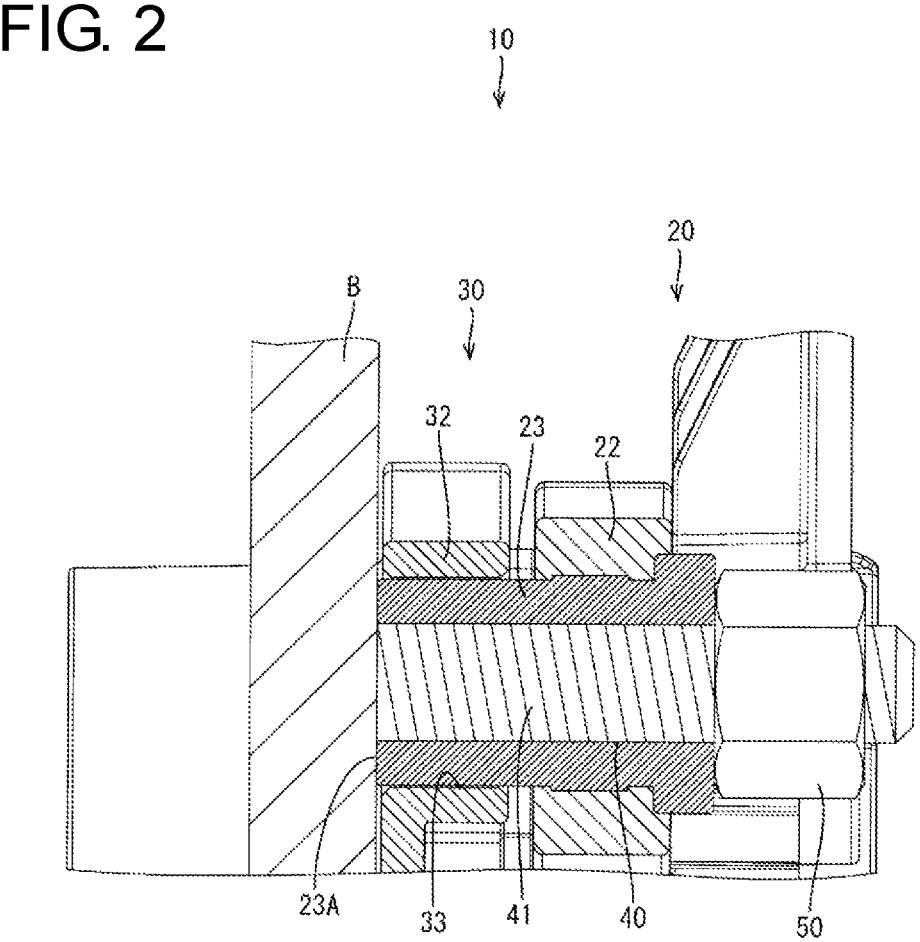
FIG. 2 is a section along A-A of FIG. 1.

As shown in FIG. 4, the second mounting plate 32 has a substantially square shape. A through hole 33 penetrates in a plate thickness direction on each of four corners of the second mounting plate 32. As shown in FIG. 1, the long collars 23 penetrate through these through holes 33 when the indicator plate 30 is mounted on the inlet body 20 from the front. That is, the long collars 23 are fixed to the first mounting plate 22 to project forward from the front surface of the first mounting plate 22, as shown in FIG. 2. This projecting part of the long collar 23 is inserted into the through hole 33 from behind, and a front end part 23A of the long collar 23 contacts the body B through the through hole 33.

Bolts 40 project back on the rear surface of the body B. The bolt 40 of this embodiment is a stud bolt fixed to the body B in advance and includes a shaft 41. This shaft 41 is inserted into the long collar 23 from the front and a nut 50 is engaged threadedly with a part of the shaft 41 projecting back from the long collar 23. As the nut 50 is engaged threadedly with the shaft 41, the nut 50 comes into contact with a rear end part of the long collar 23, the front end part 23A of the long collar 23 comes into contact with the rear surface of the body B and the long collar 23 is sandwiched between the nut 50 and the rear surface of the body B, so that the inlet body 20 and the body B are fixed by metal touch.

Figure 3:
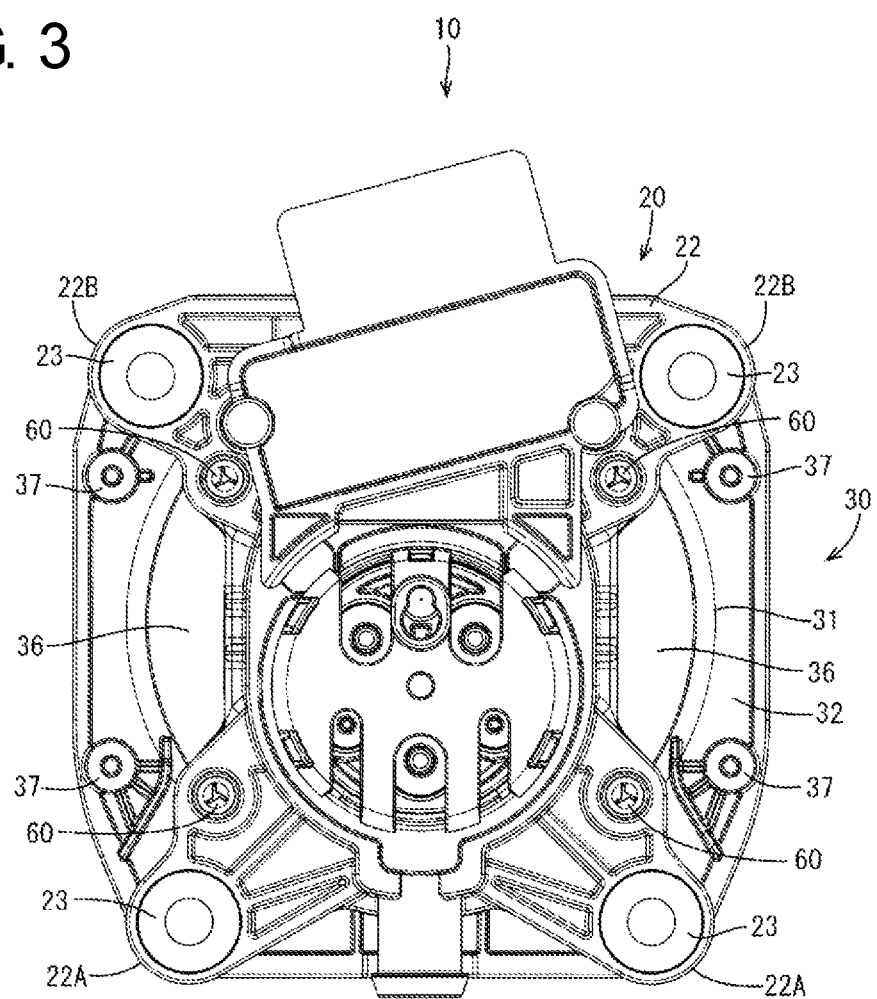
FIG. 3 is a rear view of the charging inlet.

As shown in FIG. 3, a mounting bolt 60 is inserted into the short collar 24 of the inlet body 20 from behind and a part of the short collar 24 projecting forward is engaged threadedly with the fixing nut 34 of the indicator plate 30. With this threaded engagement, a front end part of the short collar 24 comes into contact with the rear surface of the fixing nut 34 and the inlet body 20 and the indicator plate 30 are fixed by metal touch. In this way, the charging inlet 10 is configured. Further, as shown in FIG. 2, the second mounting plate 32 of the inlet body 30 is not in contact with the rear surface of the body B with the inlet body 20 fixed to the body B.

An outer diameter of the long collar 23 is slightly smaller than an inner diameter of the through hole 33. A clearance between the outer peripheral surface of the long collar 23 and the inner peripheral surface of the through hole 33 is smaller than a mounting tolerance of the short collar 24 to the fixing nut 34. Thus, the short collars 24 can be mounted to the fixing nuts 34 by inserting the long collars 23 into the respective through holes 33 so that the inlet body 20 and the indicator plate 30 can be assembled temporarily in a proper assembling posture. Therefore, an operation of inserting the mounting bolts 60 into the short collars 24 and threadedly engaging the mounting bolts 60 with the fixing nuts 34 is performed easily.

This embodiment is configured as described above and functions thereof are described next. First, how to assemble the inlet body 20 and the indicator plate 30 is described. The indicator plate 30 is arranged in front of the inlet body 20. The connector fitting portion 21 is inserted into the accommodation hole 35 from behind, so that each long collar 23 is inserted into each through hole 33 from behind. With the connector fitting portion 21 completely accommodated in the accommodation hole 35, each long collar 23 is accommodated completely in each through hole 33 and each short collar 24 and each fixing nut 34 are arranged substantially coaxially. Thus, the inlet body 20 and the indicator plate 30 are positioned in a temporarily assembled state.

Subsequently, with the inlet body 20 and the indicator plate 30 temporarily assembled, the mounting bolt 60 is inserted into each short collar 24 and engaged threadedly and fixed to each fixing nut 34. Thus, the indicator plate 30 is mounted and fixed to the inlet body 20. In this way, the charging inlet 10 is configured with each long collar 23 penetrating through the through hole 33 of the second mounting plate 32 and the front end part 23A thereof slightly projecting forward.

Thereafter, when the charging inlet 10 is mounted on the body B of the vehicle from behind, each bolt 40 projects back through each long collar 23. Here, as each nut 50 is engaged threadedly with each bolt 40, each nut 50 comes into contact with the rear end part of the long collar 23 and the front end part 23A of each long collar 23 comes into contact with the body B so that the threaded engagement of each nut 50 is stopped. In this way, the charging inlet 10 is fixed to the body B by metal touch.

As described above, in this embodiment, the tubular parts (e.g. parts commonly called collars: long collars 23 of this embodiment) made of metal and to be brought into contact with the body B have to be provided only on the first mounting plate 22 and it is sufficient to provide the second mounting plate 32 with the through holes 33. Thus, an increase in the number of tubular parts can be prevented. Further, if the tubular parts are inserted through the through holes 33, fixed portions (short collars 24) are positioned easily with respect to fixing portions (fixing nuts 34) and the indicator plate 30 is mounted easily on the inlet body 20 by fixing the fixed portions to the fixing portions.

The inlet body 20 may include the connector fitting portion 21 and the indicator plate 30 may include the indicator portion 31 arranged around the connector fitting portion 21. According to this configuration, the charging inlet 10 integrated with the indicator portion 31 is configured by arranging the indicator portion 31 around the connector fitting portion 21. Thus, the indicator portion 31 need not be mounted on the body B separately from the charging inlet 10 and an insulation space on the side of the body B becomes smaller.

A fixing part may be composed of the bolt 40 including the shaft 41 and the nut 50 with which the bolt 40 is threadedly engageable. According to this configuration, the inlet body 20 can be fixed to the body B by threadedly engaging the bolt 40 with the nut 50.

The bolt 40 may be fixed to the body B. According to this configuration, it is not necessary to hold the bolt 40 by hand and it is sufficient to pass the bolt 40 fixed to the body B through the tubular part and threadedly engage the nut 50 with the bolt 40. Thus, the inlet body 20 is fixed easily.

A plurality of tubular parts may be provided on a peripheral edge part of the first mounting plate 22 and a plurality of through holes 33 may be provided on a peripheral edge part of the second mounting plate 32. According to this configuration, the fixed portions can be positioned accurately with respect to the fixing portions since the plurality of tubular parts can be passed through the plurality of through holes 33.

The technique disclosed by this specification is not limited to the embodiment described above and illustrated in the drawings and includes, for example, the following various modes.

Although the second mounting plate 32 is arranged in front of the first mounting plate 22 in the above embodiment, a second mounting plate may be arranged behind a first mounting plate.

Although the circular tubular long collars 23 are illustrated as the tubular parts in the above embodiment, rectangular tubular metal collars may be used as the tubular parts.

Although the indicator portion 31 is arranged around the connector fitting portion 21 in the above embodiment, a connector fitting portion and an indicator portion may be arranged side by side.

Although the bolt and the nut are illustrated as the fixing part in the above embodiment, two nuts may be engaged threadedly with one shaft and the long collar 23 may be sandwiched between the two nuts. Further, the bolt may not be a stud bolt fixed to the body B and may be inserted from front into a bolt hole provided on a body.

The short collar 24 is illustrated as the fixing portion, the fixing nut 34 is illustrated as the fixed portion and the short collar 24 is fixed to the fixing nut 34 by the mounting bolt 60 in the above embodiment. However, a tapping screw may be directly screwed into the second mounting plate 32 (fixed portion).

Although the four long collars 23 are fixed on the four corners of the first mounting plate 22 in the above embodiment, two long collars 23 may be fixed at diagonal positions of the second mounting plate 22.

LIST OF REFERENCE SIGNS

10 . . . charging inlet
20 . . . inlet body
21 . . . connector fitting portion
22 . . . first mounting plate
23 . . . long collar (tubular part)
23A . . . front end part
24 . . . short collar (fixed portion)
30 . . . indicator plate
31 . . . indicator portion
32 . . . second mounting plate
33 . . . through hole
34 . . . fixing nut (fixing portion)
40 . . . bolt (fixing part)
41 . . . shaft
50 . . . nut (fixing part)
60 . . . mounting bolt
B . . . body

The invention claimed is:

1. A charging inlet, comprising:
   an inlet body including a first mounting plate to be mounted on a body of a vehicle, the first mounting plate having a fixed portion;
   an indicator plate including a second mounting plate arranged between the body and the first mounting plate and having a through hole and a fixing portion having the fixed portion fixed thereto, the indicator plate being mounted on the inlet body by fixing the fixed portion to the fixing portion;
   a tubular part made of metal, provided to project from the first mounting plate toward the body and penetrating through the through hole of the second mounting plate; and
   a fixing part made of metal, including a shaft to be inserted into the tubular part and configured to fix the inlet body to the body with an end part of the tubular part held in contact with the body.

2. The charging inlet of claim 1, wherein a plurality of the tubular parts are provided on a peripheral edge part of the first mounting plate, and a plurality of the through holes are provided on a peripheral edge part of the second mounting plate.

3. The charging inlet of claim 1, wherein the inlet body includes a connector fitting portion and the indicator plate includes an indicator portion arranged around the connector fitting portion.

4. The charging inlet of claim 3, wherein the fixing part is composed of a bolt having the shaft and a nut with which the bolt is threadedly engageable.

5. The charging inlet of claim 4, wherein the bolt is fixed to the body.

6. The charging inlet of claim 5, wherein a plurality of the tubular parts are provided on a peripheral edge part of the first mounting plate, and a plurality of the through holes are provided on a peripheral edge part of the second mounting plate.

7. The charging inlet of claim 1, wherein the fixing part is composed of a bolt having the shaft and a nut with which the bolt is threadedly engageable.

8. The charging inlet of claim 7, wherein the bolt is fixed to the body.

9. The charging inlet of claim 8, wherein a plurality of the tubular parts are provided on a peripheral edge part of the first mounting plate, and a plurality of the through holes are provided on a peripheral edge part of the second mounting plate.

* * * * *